Figure 1:
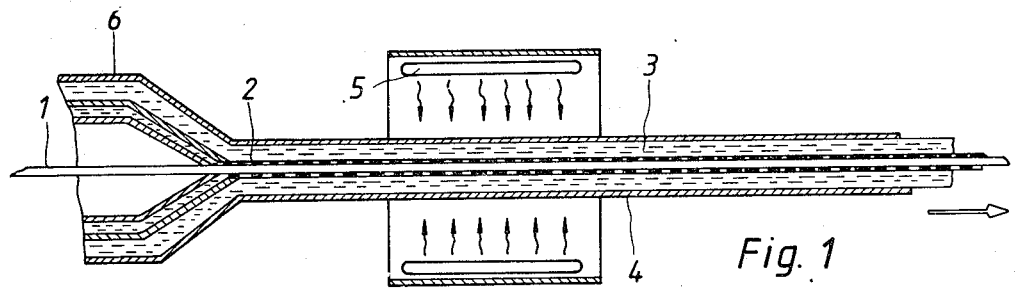

United States Patent [19]

Linderoth et al.

[11] 4,234,624
[45] Nov. 18, 1980

[54] METHOD OF APPLYING AN INSULATION OF CROSS-LINKED POLYMER ON A CABLE CONDUCTOR

[75] Inventors: Gustaf Linderoth, Bromma; Karl-Gunnar Wiberg, Stockholm, both of Sweden

[73] Assignee: ASEA Aktiebolag, Vesteras, Sweden

[21] Appl. No.: 16,505

[22] Filed: Mar. 1, 1979

[30] Foreign Application Priority Data

Mar. 7, 1978 [SE] Sweden .................................. 7802547

[51] Int. Cl.³ ............................................. B05D 3/06
[52] U.S. Cl. .............................. 427/55; 174/102 SC; 174/110 R; 427/120; 427/388.2
[58] Field of Search ............. 427/55, 117, 120, 385 R, 427/388 R, 388 A; 174/102 SC, 110 R

[56] References Cited

U.S. PATENT DOCUMENTS

| 3,441,660 | 4/1969 | Garner | 174/102 SC |
| 3,485,938 | 12/1969 | Kingsley | 427/118 |
| 3,646,248 | 2/1972 | Ling et al. | 174/102 SC |

FOREIGN PATENT DOCUMENTS 1526488  4/1968  France .......................................... 427/55

*Primary Examiner*—John H. Newsome
*Attorney, Agent, or Firm*—Watson, Cole, Grindle & Watson

[57] ABSTRACT

An insulation of cross-linked polymer is extruded about a cable conductor and cross-linked by means of heating in a vulcanization tube. The heating is effected by radiation energy, at least the main part of the radiation having wavelengths between 0.76 μm and 4 μm and a tube which is permeable to the radiation being used as vulcanization tube.

6 Claims, 5 Drawing Figures

METHOD OF APPLYING AN INSULATION OF CROSS-LINKED POLYMER ON A CABLE CONDUCTOR

BACKGROUND OF THE INVENTION

In the continuous manufacture of electric cables having an insulation of cross-linked polymer, the polymer is extruded in cross-linkable form around the cable conductor and is then cross-linked by means of heating under pressure in a vulcanization tube. Organic peroxides are usually used to effect the cross-linking.

Heating may be effected by known methods using water vapor, a gas, a molten inorganic salt, or from hot walls with which the polymer is brought into direct contact. In all these methods the heat is transmitted from the surface of the cable to the inside, which involves high surface temperature and a temperature drop towards the center of the cable. Since polymer material has a relatively low coefficient of thermal conductivity, the production rate is limited, especially for cables with considerable insulation thickness, by the fact that the heat transmission cannot be further increased by conduction in the polymer material once the surface temperature of the cable has reached a magnitude corresponding to the decomposition temperature of the material. The resistance to thermal conductivity for a 30 m polythene insulation with a surface temperature of 250° C., for instance, is as much as about 250 cm°C.sec/cal and for a 5 mm insulation layer about 50 cm°C.sec/cal. The polymer which is to form the cable insulation must be heated sufficiently for the inner regions of the insulation to achieve the requisite degree of cross-linking.

Electric cables intended for high operatiing voltages are normally provided with an electrically-conducting layer (nner semi-conductor) extruded around the conductor and a conducting layer (outer semi-conductor) extruded around the outer surface of the insulation, both of these layers being of polymer material, the conducting properties of which are effected by mixing in carbon black of conducting type. The carbon black makes the layers black. These conducting layers are usually cross-linked at the same time as the polymer in the insulation is cross-linked.

It is also known to provide the heating for the cross-linking by means of radiation energy. With this known method the cable conductor with extruded cross-linkable polymer, but without outer conducting layer, is passed through a vulcanization tube of steel, the walls of which are heated to 400°–500° C. and which contains an inert gas, to effect the requisite pressure on the extruded polymer. Heat is then transmitted to the cable through radiation and convection. With transparent polymers in the cable insulation this method gives a certain increase in the production rate, explained by the fact that the thermal radiation can penetrate the polymer so that radiation energy is transmitted to the inner part of the cable. Most of the radiation energy, however, is taken up by the surface layer of the cable.

According to the present invention it has proved possible to attain a considerably higher production rate than was possible with methods known hitherto. A particularly noticeable increase in the production rate has been achieved for cables with thick insulation. This is because according to the invention it is possible to effectively transmit heat to the inner parts of the cable and thus achieve rapid heating of the entire cross-section of the cable as well as rapid cross-linking through the entire cross-section. Furthermore, as will be described in more detail later on, the present invention also permits continuous inspection of the cable conductor or inner conducting layer and insulation during manufacture so that corrections can be made in the manufacturing process as necessary.

SUMMARY OF THE INVENTION

More specifically, the present invention relates to a method of applying an insulation of cross-linked polymer on a cable conductor in which cross-linkable polymer is extruded around the cable conductor and thereafter cross-linked by means of heating with radiation energy while the polymer is being subjected to pressure in a vulcanization tube, characterised in that heating of the polymer is effected by means of radiation energy generated outside the vulcanization tube, at least the main part of the radiation having wavelengths between 0.76 microns and 4 microns, and that a vulcanization tube which is pervious to the radiation is used.

The polymer used shall have good perviousness for the radiation at the temperature for the extrusion and cross-linking. Examples of suitable polymers are polyethylene and copolymers of ethylene with another unsaturated monomer such as ethylacrylate, butylacrylate and vinylacetate. In the copolymer the weight of ethylene constitutes preferably at least 60 percent of the total weight of ethylene and other unsaturated compound. The polymer is provided with a peroxide or some other substance with the ability to effect cross-linking. Examples of suitable peroxides include di-α-cumyl peroxide, di-tert.-butyl peroxide and 2,5-dimethyl-2,5-di(t-butyl-peroxi)-hexine-3. The quantity of peroxide is suitably 0.1–5 parts by weight per 100 parts by weight of the polymer. The polymer is generally also provided with an anti-oxidant such as polymerized trimethylhydrokinolin or aldol-α-naphthylamine, suitably in a quantity of 0.5–5 parts by weight per 100 parts by weight of the polymer.

The radiation, which at least for the most part has wavelengths between 0.76 microns and 4 microns, that is to say, consists of near infrared radiation, may be generated using infrared radiation sources with temperatures exceeding 1100° C., preferably exceeding 1200° C. The radiation energy is transmitted to the inner parts of the cable upon radiation. The more pervious the polymer is to the radiation, the more efficient will be this transfer of energy. If the cable conductor is provided with an inner conducting layer containing carbon black, this will increase the heating of the inner parts of the cable achieved by the infrared radiation.

The vulcanization tube pervious to the radiation may consist of glass, quartz or polytetrafluoroethylene, for instance.

The pressure on the polymer in the vulcanization tube may be achieved by utilizing the thermal expansion of the polymer during heating, together with pressure from the nozzle of the extrusion machine at one end of the vulcanization tube and pressure from coolant at the other end of the vulcanization tube. Suitably a lubricant is also sprayed in under pressure between the inner wall of the vulcanization tube and the extruded polymer. Suitable lubricants include molten polymer material, an organic peroxide or an oil. The pressure may also be effected by a gas such as nitrogen gas or some other gas which is indifferent to the polymer, the gas being introduced between the extruded polymer and the inner wall of the vulcanization tube.

Since the vulcanization tube and the extruded polymer in the application described are transparent, the cable conductor or inner conducting layer can be checked by means of ocular inspection during manufacture. In the case of high-tension electric cables, large imperfections in the form of peaks, ridges or scorched, hard particles in the boundary surface between conducting layer and insulation increase the electrical stress and have a detrimental effect on the quality of the cable. The maximum electrical stress appears at the electrically conducting layer extruded around the cable. Thus it is a considerable advantage to be able to inspect this inner conducting layer through the production process.

Impurities in the cable insulation in the form of foreign particles may also have a devastating effect on the electrical strength or service life of the cable in the case of high-tension electrical cables. With the aid of a detector, for instance in the form of photocell equipment, the occurrence of impurities can be revealed and appropriate measures taken straight away in the manufacturing process.

It is also possible by adding a color indicator to the polymer which changes color when cross-linking has been achieved, to perform a direct, visual inspection to ensure that the required degree of cross-linking has been achieved.

The invention will be explained further by describing examples with reference to the accompanying drawing in which FIGS. 1—5 illustrate various methods and means for performing the method according to the present invention.

In the figures the cable conductor is designated 1, the inner conducting layer 2, the extruded polymer forming the cable insulation is designated 3, the vulcanization tube 4, the radiation source 5 and the extrusion machine in which extrusion takes place is designated 6.

The conductor is of conventional type and may consist of copper or aluminium. The inner conducting layer may consist of a copolymer of ethylene and ethylacrylate (weight ratio 80:20) containing 40 parts by weight carbon black of conducting type per 100 parts by weight copolymer. The polymer in the insulation may consist of LD polyethylene having a melt index of 0.2—20, containing 2 parts by weight di-α-cumylperoxide and 0.2 parts by weight polymerized trimethyldihydroquinolin per 100 parts by weight polyethylene. The vulcanization tube may be of glass. The radiation source may consist of several infrared lamps with tungsten filaments placed around the vulcanization tube and operating at a temperature of 2100° C., thus providing radiation with maximum intensity at a wavelength of 1.2 microns. If lamps operating at 2700° C. are used, the corresponding maximum intensity is obtained at 1.0 microns.

According to FIG. 1 the conductor 1 is provided in the extrusion machine 6 first with an inner conducting layer 2 and on top of this a polyethylene layer 3. Upon extrusion the polyethylene has a temperature of about 125° C. When the conductor with layers 2 and 3 passes the radiation source 5, the polymers in layers 2 and 3 are cross-linked and then cooled with water or gas under pressure in a cooling tube, not shown, connected to the righthand end of the vulcanization tube 4. The polymer is subjected to pressure in the vulcanization tube since the polymer expands during the heating. Since at the moulding temperature the polyethylene, and also the vulcanization tube, allow the near infrared radiation to pass through, the cable conductor and inner conducting layer are rapidly heated resulting in rapid through-heating and rapid cross-linking of the polymer through the cross-section.

Figure 2:
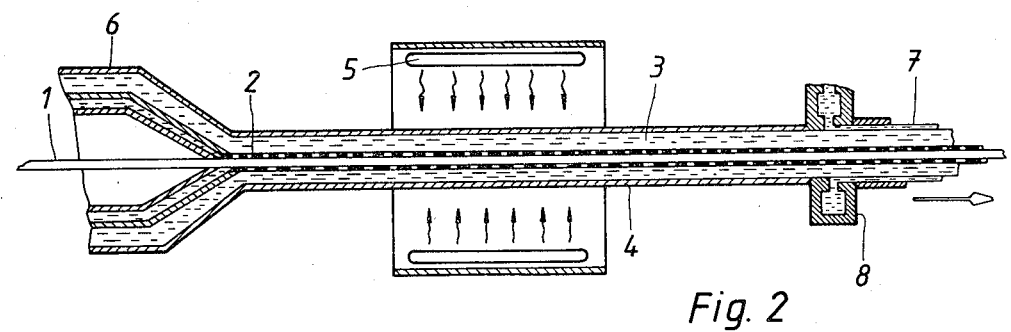

In the embodiment according to FIG. 2 an outer conducting layer 7 is applied in an extrusion machine 8. The material in the layer 7 may consist of a copolymer of ethylene and vinylacetate (weight ratio 60:40) containing 20 parts by weight carbon black of conducting type per 100 parts by weight copolymer.

Figure 3:
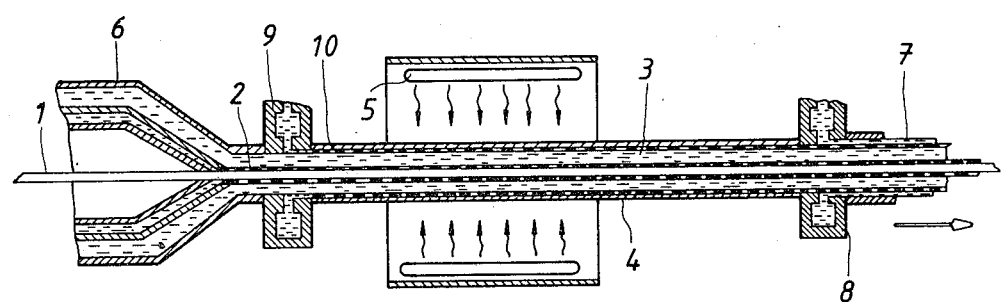

In the embodiment according to FIG. 3 a lubricating material 10 consisting, for instance, of a molten polyethylene having melt index 0.2—20 or a peroxide such as di-α-cumylperoxide, is sprayed under pressure between the extruded polymer and the vulcanization tube through a nozzle 9.

Figure 4:
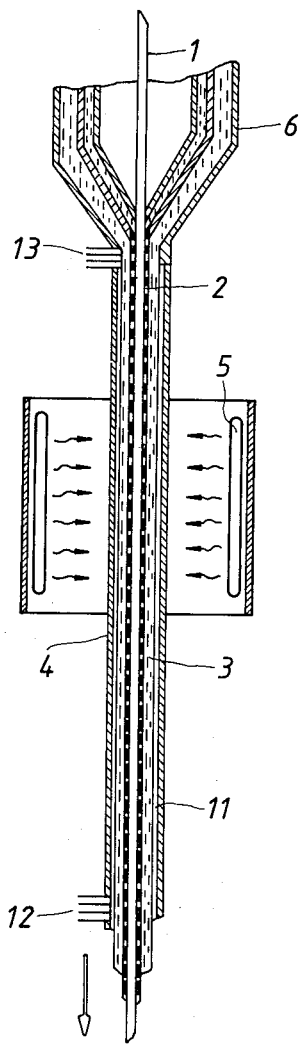

In the embodiment according to FIG. 4 an indifferent gas 11, such as nitrogen gas, having a pressure of between 0.5 and 3 MPa is arranged between the extruded polymer and the inner walls of the vulcanization tube. The gas can be kept stationary or it may be caused to circulate, in which case an inlet 12 and outlet 13 are arranged at the outlet and inlet ends of the vulcanization tube.

Figure 5:
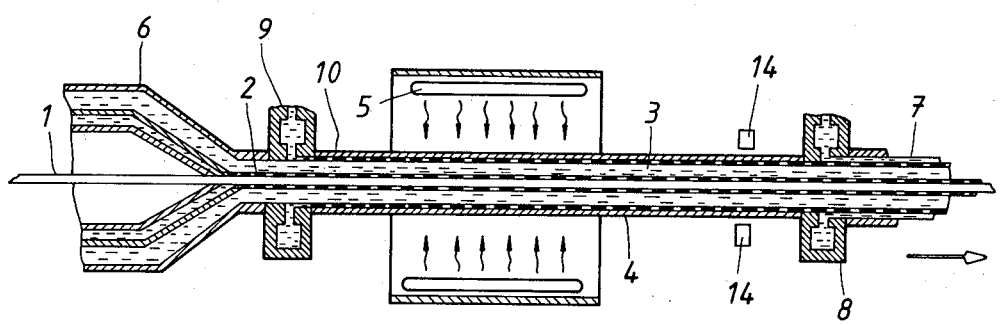

In the embodiment according to FIG. 5 a detector 14 is applied outside the vulcanization tube. The detector gives information as the occurrence of foreign particles in the polymer material. The transparency of the vulcanization tube and the polymer is thus utilized.

We claim:

1. In a method of applying an insulation of cross-linked polymer onto a cable conductor in which a cross-linkable polymer is extruded around the cable conductor and thereafter cross-linked by the simultaneous application of heat and pressure in a vulcanization tube, the improvements of heating the cross-linkable polymer by use of radiation energy having at least its main portion with wavelengths of between 0.76 and 4 microns, locating the radiation energy generating means outside of the vulcanization tube, and utilizing a vulcanization tube which is pervious to the said radiation energy so as to allow its passage therethrough.

2. The method of claim 1 wherein pressure on the extruded polymer is achieved by pressing the extruded polymer against the inner wall of the utilized vulcanization tube.

3. The method of claim 2 wherein an intermediate lubricant is sprayed between the extruded polymer and the inner wall of the utilized vulcanization tube.

4. The method of claim 1 wherein the pressure on the polymer is achieved by supplying a pressurized gas between the extruded polymer and the inner wall of the utilized vulcanization tube.

5. The method of claim 1 wherein prior to the application of the cross-linkable polymer onto the cable conductor, a layer containing a conducting type carbon black is applied around the cable conductor.

6. The method of claim 1 including the additional step of extruding an outer conducting layer onto the cross-linked polymer layer.

* * * * *